(12) United States Patent
Yamamoto et al.

(10) Patent No.: US 7,481,582 B2
(45) Date of Patent: Jan. 27, 2009

(54) BEARING DEVICE AND PIN FOR BEARING DEVICE

(75) Inventors: Teiji Yamamoto, Hirakata (JP); Akira Hashimoto, Hirakata (JP); Hiroshi Yamamoto, Hiratsuka (JP)

(73) Assignee: Komatsu, Ltd., Tokyo (JP)

( * ) Notice: Subject to any disclaimer, the term of this patent is extended or adjusted under 35 U.S.C. 154(b) by 87 days.

(21) Appl. No.: 11/313,700

(22) Filed: Dec. 22, 2005

(65) Prior Publication Data

US 2006/0093249 A1  May 4, 2006

Related U.S. Application Data

(62) Division of application No. 10/394,573, filed on Mar. 24, 2003, now Pat. No. 7,354,200.

(30) Foreign Application Priority Data

Mar. 29, 2002 (JP) .............................. 2002-95320

(51) Int. Cl.
*F16C 1/24* (2006.01)
*F16C 33/02* (2006.01)
*B62D 55/12* (2006.01)
(52) U.S. Cl. ................... 384/372; 384/286; 384/375; 305/202

(58) Field of Classification Search ................. 384/291, 384/292, 286, 372, 390
See application file for complete search history.

(56) References Cited

U.S. PATENT DOCUMENTS

| 3,976,342 | A |   | 8/1976  | Leyendecker et al. |
| 4,558,960 | A |   | 12/1985 | Lehtinen et al. |
| 4,655,615 | A |   | 4/1987  | Mori |
| 5,857,318 | A |   | 1/1999  | Odai et al. |
| 6,109,706 | A | * | 8/2000  | Oertley ........................ 305/202 |

* cited by examiner

*Primary Examiner*—Marcus Charles
(74) *Attorney, Agent, or Firm*—Westerman, Hattori, Daniels & Adrian, LLP.

(57) ABSTRACT

To provide a bearing device, which can be easily processed, and whereby, its durability is capable of being improved and a load (tractional force) can be remarkably increased till the burn-in occurs and a pin for the bearing device. The bearing device is provided with a bush and a pin to be inserted in this bush. When an external force is acting in a certain direction, the bush and the pin are relatively rocked, and a slidable range H is formed, in which an outer peripheral face of the pin and an inner peripheral face of the bush partially and slidably contact with each other. An oil reservoir is provided at the side of the pin in order to prevent a no-lubrication portion, to which no lubrication oil is supplied, from being formed in the slidable range H.

3 Claims, 11 Drawing Sheets

BEARING DEVICE AND PIN FOR BEARING DEVICE

This application is a Divisional of application Ser. No. 10/394,573, filed Mar. 24, 2003 now U.S. Pat. No. 7,354,200.

BACKGROUND OF THE INVENTION

1. Field of the Invention

The present invention relates to a bearing device and a pin for the bearing device, and more particularly, relates to a bearing device of a crawler track or the like that is used for a travel device of a construction machine and a pin for the bearing device.

2. Description of the Related Art

Generally, a travel device of a construction machine is configured as a result that a crawler track is winded around an idler and a sprocket. Then, as shown in FIG. 13, a crawler track 53 is configured by a plurality of links 54 to be endlessly coupled with each other and a plurality of shoe plates (its illustration is herein omitted) or the like to be attached to these links 54. In other words, in the crawler track 53, the opposed links 54 are coupled in a longitudinal direction through a pin 57 and bushes 58 and 59, respectively to form a pair of endless bodies 60, and the shoe plates are attached to these endless bodies 60.

In this case, end portions 61 and 62 of the adjacent links 54 are superposed with each other, unilateral bushes 58 are pressed into holes 61a of the end portions 61 at the inside of the opposed links 54, and the pin 57 is rotatably inserted in the bushes 58. On this occasion, the end portions of the pin 57 are pressed into holes 62a of the end portions 62 at the outside of the opposed links 54. In addition, between the end portions 61 at the inside of the opposed links 54, the other bush 59 is externally fit in the pin 57. Further, lubrication oil is supplied between the pin 57 and the bushes 58 and 59. In addition, seal devices 64 and 65 are disposed between the bushes 58 and 59, and between the bush 58 and the end portion 62 of the link 54, respectively.

Accordingly, when the sprocket is rotatably driven, the crawler track 53 that is configured as described above is driven while maintaining an oval form. On this occasion, a unidirectional tractional force acts on the crawler track 53, and furthermore, when the crawler track 53 is travelling around the idler and the sprocket, a bearing device configured by the pin 57 and the bush 58 or the like may rotate around the idler and the sprocket. As a result, the bush 58 and the pin 57 are relatively rocked, and as shown in FIG. 14, conventionally, a slidable range H is formed, in which the outer peripheral face of the pin 57 and the inner peripheral face of the bush 58 partially and slidably contact with each other. In other words, under the condition that a pin axial center O of the pin 57 is decentered against a bush axial center O1 of the bush 58 in a certain direction, and then, the slidable range H is formed.

In this slidable range H, a center angle A centering on the pin axial center O is within the range of 70 degrees to 90 degrees. In addition, in the case that a strong tractional force acts on the pin 57 and the bush 58, a rocking angle ($\alpha/2+\alpha/2$) of the pin 57 with respect to the bush 58 is about 30 degrees. Therefore, a no-lubrication portion C (a center angle C1), to which the lubrication oil is not supplied even when the pin 57 and the bush 58 are rocked, is formed.

Therefore, if the operation is continued under such a condition, the burn-in may occur between the pin 57 and the bush 58 even with a relatively low load (tension), so that this involves a problem with durability.

SUMMARY OF THE INVENTION

The present invention has been made taking the problems into consideration, and an object of the present invention is to provide a bearing device, which can be easily processed, and whereby, its durability is capable of being improved and a load (tractional force) can be remarkably increased till the burn-in occurs; and a pin for the bearing device.

In order to attain the above described object, a bearing device according to a first embodiment of the present invention may include a bush and a pin that is inserted into the bush; wherein, when an external force is acting in a certain direction, the bush and the pin are relatively rocked, and a slidable range is formed, in which an outer peripheral face of the pin and an inner peripheral face of the bush partially and slidably contact with each other, and an oil reservoir is provided at the side of the pin in order to prevent a no-lubrication portion, to which no lubrication oil is supplied, from being formed in the slidable range.

According to the bearing device according to the first aspect of the present invention, it is possible to prevent the no-lubrication portion, to which no lubrication oil is supplied, from being formed by the oil reservoir in the slidable range, in which the outer peripheral face of the pin and the inner peripheral face of the bush partially and slidably contact with each other. Thereby, as compared to the conventional bearing device in which the no-lubrication portion is formed, the bearing device having the excellent durability is capable of being realized and a load (tractional force) can be remarkably increased till the burn-in occurs.

According to the bearing device according to a second aspect of the present invention, an oil reservoir, which is elongated along a pin axial center direction, is formed on an outer peripheral face of the pin, and the oil reservoir is rocked centering on a center of a peripheral direction of the slidable range when a circumferential direction range of the oil reservoir is set not more than a center angle, i.e., 40 degrees centering on the pin axial center.

According to the bearing device according to the second aspect of the present invention, the oil reservoir is elongated along the pin axial center direction, the circumferential direction range of the oil reservoir is set not more than a center angle, i.e., 40 degrees centering on the pin axial center, and further, the oil reservoir is rocked around the center of the peripheral direction of the slidable range. Therefore, it is possible to certainly prevent the formation of the no-lubrication portion by rocking of the pin to the bush. Thereby, it is possible to effectively prevent the occurrence of burn-in.

According to the bearing device according to a third aspect of the present invention, the circumferential direction range of the oil reservoir is set to a center angle, i.e., 10 to 30 degrees centering on the pin axial center.

According to the bearing device according to the third aspect of the present invention, it is possible to more certainly prevent the formation of the no-lubrication portion. Thereby, it is possible to more effectively prevent the occurrence of burn-in.

According to the bearing device according to a fourth aspect of the present invention, an oil reservoir configured by first and second oil reservoirs, which are elongated along a pin axial center direction, is formed on an outer peripheral face of the pin, and, when a range of an interval between the first and second oil reservoirs is set not more than a center angle, i.e., 40 degrees centering on the pin axial center, the interval is rocked centering on a center of a peripheral direction of the slidable range.

According to the bearing device according to the fourth aspect of the present invention, the oil reservoir is configured by the first and second oil reservoirs, which are elongated along the pin axial center direction, the range of the interval between the first and second oil reservoirs is set not more than the center angle, i.e., 40 degrees centering on the pin axial center, and the interval is rocked centering on the center of the peripheral direction of the slidable range. Therefore, it is possible to certainly prevent the formation of the no-lubrication portion by rocking of the pin to the bush. Thereby, it is possible to effectively prevent the occurrence of burn-in.

According to the bearing device according to a fifth aspect of the present invention, the oil reservoir is configured by a flat face portion, which is formed on the outer peripheral face of the pin along a pin axial center direction.

According to the bearing device according to the fifth aspect of the present invention, the oil reservoir is configured by the flat face portion, which is formed on the outer peripheral face of the pin along the pin axial center direction. Therefore, it is possible to easily form (process) the oil reservoir, and it is possible to realize the bearing device with an excellent productivity.

According to the bearing device according to a sixth aspect of the present invention; the oil reservoir is configured by a plurality of punctate concave portions, which are formed on the outer peripheral face of the pin.

According to the bearing device according to the sixth aspect of the present invention, the oil reservoir is configured by a plurality of punctate concave portions, which are formed on the outer peripheral face of the pin, so that it is possible to form the punctate concave portions by so-called shot peening or the like. As a result, a special device is not needed to process the punctate concave portions and the oil reservoir can be easily formed.

According to the bearing device according to a seventh aspect of the present invention, at least two of the punctate concave portions are arranged in the range not more than the center angle, i.e., 40 degrees centering on the pin axial center on the same circumferential direction on the outer peripheral face of the pin.

According to the bearing device according to the seventh aspect of the present invention, at least two of the punctate concave portions are arranged in the range not more than the center angle, i.e., 40 degrees centering on the pin axial center on the same circumferential direction on the outer peripheral face of the pin. Therefore, it is possible to certainly prevent the formation of the no-lubrication portion by rocking of the pin to the bush. Thereby, it is possible to effectively prevent the occurrence of burn-in.

According to the bearing device according to an eighth aspect of the present invention, an oil reservoir is provided on an outer peripheral face of the pin.

According to the bearing device according to the eighth aspect of the present invention, the oil reservoir is provided on the outer peripheral face of the pin, so that it is possible to prevent the no-lubrication portion, to which no lubrication oil is supplied, from being formed at the side of the outer peripheral face of the pin. Thereby, the bearing device having the excellent durability is capable of being realized and a load (tractional force) can be remarkably increased till the burn-in occurs.

According to the bearing device according to a ninth aspect of the present invention, the oil reservoir is configured by a flat face portion, which is formed on the outer peripheral face of the pin along a pin axial center direction.

According to the bearing device according to the ninth aspect of the present invention, it is possible to easily form (process) the oil reservoir, and it is possible to realize the bearing device with an excellent productivity.

According to the bearing device according to a tenth aspect of the present invention, the oil reservoir is configured by a plurality of punctate concave portions, which are formed on the outer peripheral face of the pin.

According to the bearing device according to the tenth aspect of the present invention, it is possible to form a plurality of punctate concave portions by so-called shot peening or the like. As a result, a special device is not needed to process the punctate concave portions and the oil reservoir can be easily formed.

DESCRIPTION OF THE PREFERRED EMBODIMENTS

Figure 1:
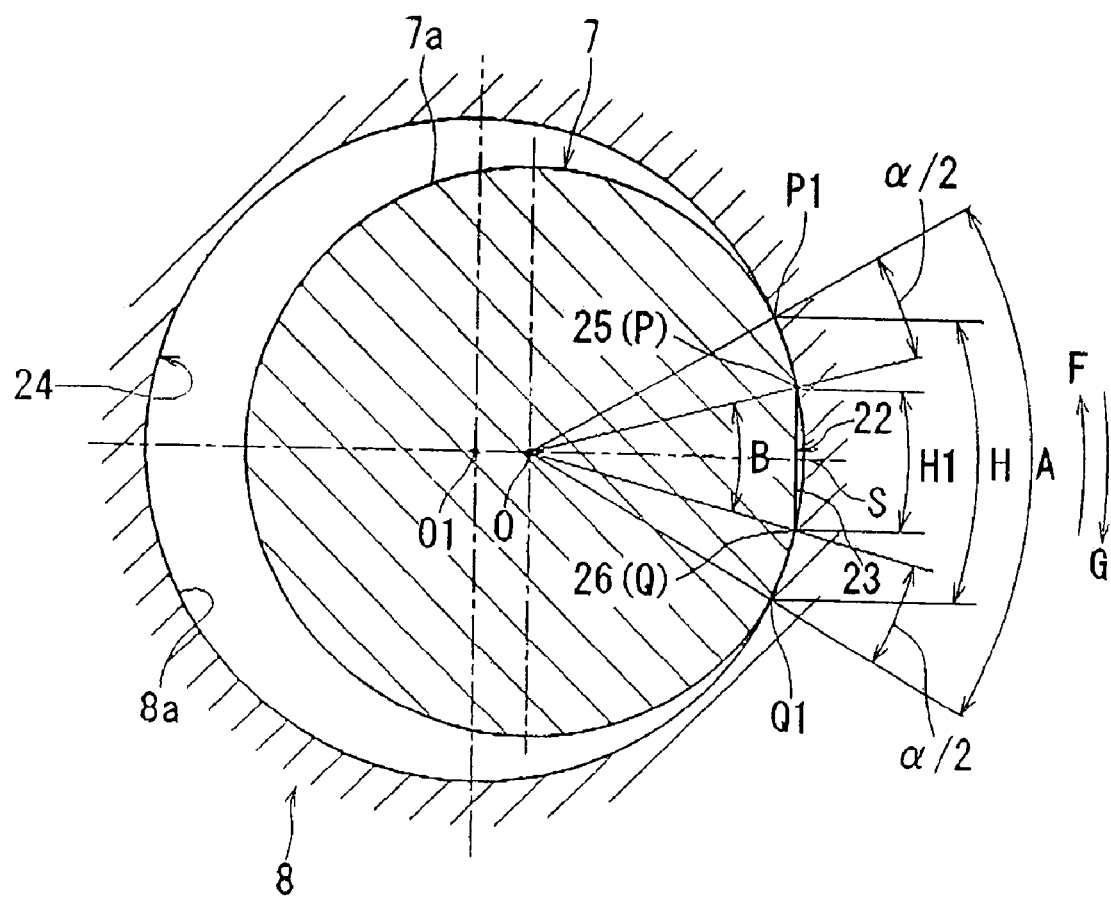
FIG. 1 is a substantial part simplified cross sectional view for showing an embodiment of a bearing device according to the present invention.
Figure 2:
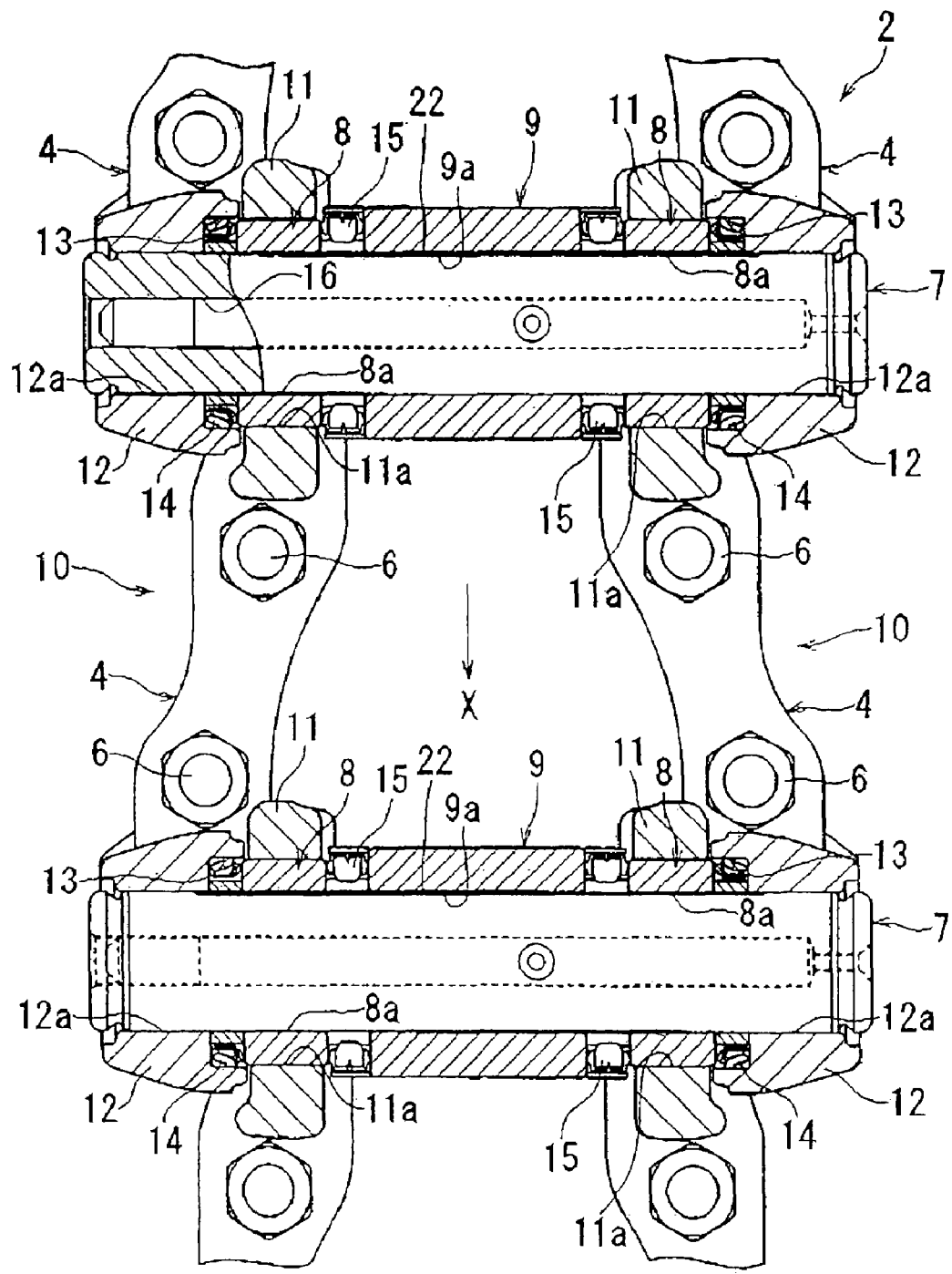
FIG. 2 is a cross sectional view of a crawler track, in which the above described bearing device is used.

In the next place, specific embodiments of a bearing device according to the present invention will be described in detail below with reference to the drawings. FIG. 1 is a substantial part simplified cross sectional view of the bearing device according to the present invention. For example, this bearing device is used in a crawler track 2 to be used for a travel device 1 of a construction machine shown in FIG. 4. As shown in FIG. 2, the crawler track 2 is configured by a plurality of links 4 to be endlessly coupled with each other and a plurality of shoe plates 5 (see FIG. 4) to be attached to these links 4 or the like. In other words, in the crawler track 2, the opposed links 4 are coupled in a longitudinal direction through a pin 7 and bushes 8 and 9, respectively to form a pair of endless bodies 10, and the shoe plates 5 are attached to these endless bodies 10 by fastening means 6 using a bolt and nut bond.

In this case, end portions 11 and 12 of the adjacent links 4 are superposed with each other, unilateral bushes 8 are pressed into holes 11a of the end portions 11 at the inside of the opposed links 4, and the pin 7 is rotatably inserted in the bushes 8. On this occasion, the end portions of the pin 7 are pressed into holes 12a of the end portions 12 at the outside of the opposed links 4. In addition, between the end portions 11 at the inside of the opposed links 4, the other bush 9 is externally fit in the pin 7. Thus, the bearing device according to the present invention is configured by the pin 7 and the bushes 8 and 9 or the like.

Then, a concave portion 13 is formed in inner faces of the end portions 12, and a first seal device 14 is fit in this concave portion 13. Further, a second seal device 15 is fit in the pin 7 between the bush 8 and the bush 9. In addition, a hole portion 16 is formed on the pin 7, in which a lubrication oil is supplied, an the lubrication oil within this hole portion 16 is set to be supplied between the pin 7 and the bushes 8,9.

Figure 4:
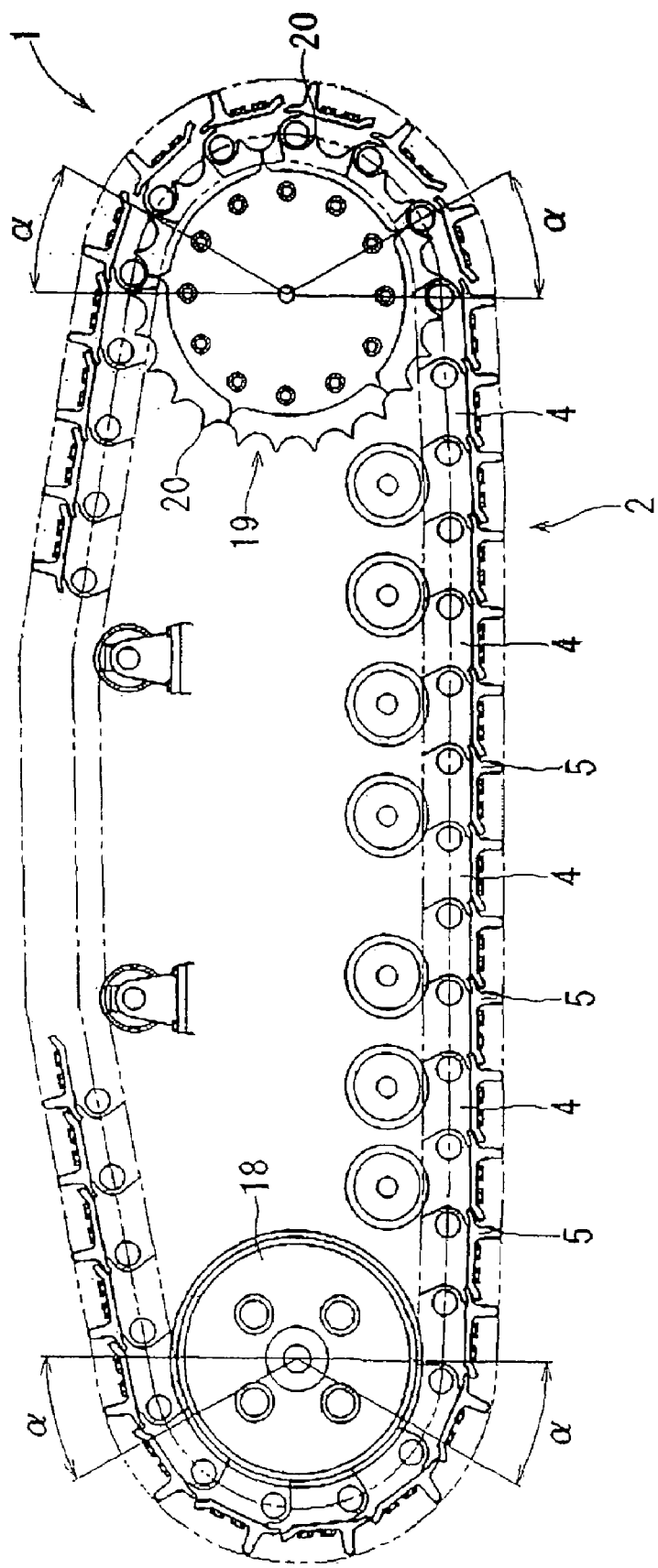
FIG. 4 is a side view of a travel device using a crawler track, in which the above described bearing device is used.

As shown in FIG. 4, this crawler track 2 is winded around an idler 18 and a sprocket 19 of the construction machine. Accordingly, when a sprocket 19 is rotatably driven, the crawler track 2 is driven while maintaining an oval from a side view. On this occasion, a nail 20 of the sprocket 19 locks the bush 9 and the torque of the sprocket 19 is provided to the bush 9. Therefore, a unidirectional tractional force acts from the pin 7 to the bush 8. In FIG. 2, the travel device travels in a direction represented by an arrowhead X. In addition, when the crawler track 2 is travelling around the idler 18 and the sprocket 19, this bearing device may rotate around the idler 18 and the sprocket 19 and then, the bush 8 and the pin 7 are relatively rocked. As a result, as shown in FIG. 1, a slidable range H (a center angle A) is formed, in which an outer peripheral face 7a of the pin 7 and an inner peripheral face 8a of the bush 6 partially and slidably contact with each other. In other words, a pin axial center O of the pin 7 is decentered against a bush axial center O1 of the bush 8 in a certain direction (i.e., a direction opposed to the travelling direction X).

Figure 3:
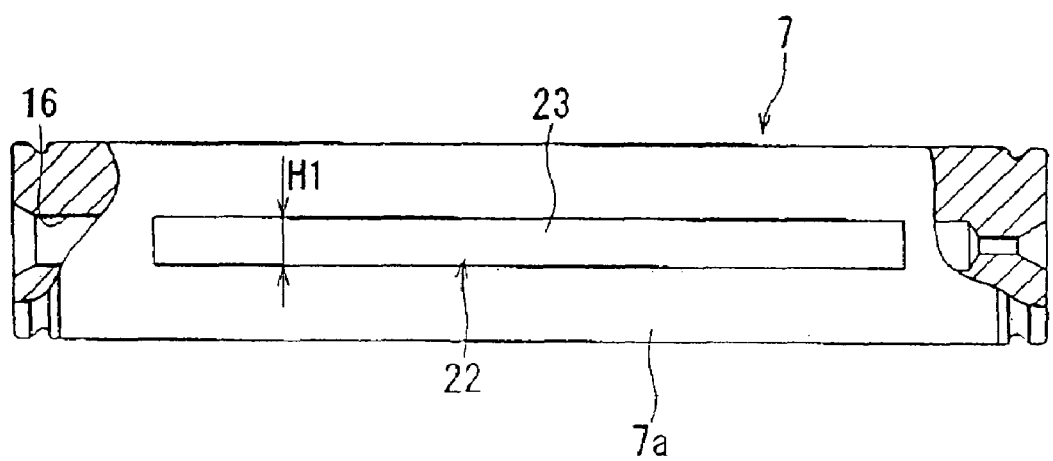
FIG. 3 is a plan view of a pin of the above described bearing device.

In this case, as described later, an oil reservoir 22 for preventing a no-lubrication portion, to which no lubrication oil is supplied, from being formed in the slidable range H is disposed at the side of the above described pin 7. As shown in FIG. 3, the oil reservoir 22 is configured by a flat face portion 23 elongated along a pin axial center direction, and the lubrication oil is accumulated there.

When the crawler track that is configured as described above travels, the pin 7 and the bush 8 are relatively rocked, however, if the side of the bush 8 stops, this oil reservoir 22 may be rocked in a circumferential direction around a center S in a circumferential direction of the slidable range H. Then, as shown in FIG. 4, this rocking angle (i.e., a center angle centering on the pin axial center O) α is decided by a diameter measurement of the idler 18 and the sprocket 19, the measurement between the adjacent pins 7 of the crawler track 2, and the like.

Therefore, in the case that the pin 7 is rocked in a direction represented by an arrowhead F with respect to the bush 8 under the condition shown in FIG. 1, P at the side of the pin 7 is moved to P1, and further, in the case that the pin 7 is rocked in a direction represented by an arrowhead G with respect to the bush 8 under the condition shown in FIG. 1, Q at the side of the pin 7 is moved to Q1. In this case, P1 corresponds to one edge of the slidable range H and Q1 corresponds to the other edge of the slidable range H. Accordingly, the slidable range H and range from P1 to Q1 at the opposite side comprises an oil supply portion 24, to which the lubrication oil is supplied. Therefore, if one edge 25 of the oil reservoir 22 is mated to this P and the other edge 26 of the oil reservoir 22 is mated to this Q, the no-lubrication portion, to which no lubrication oil is supplied, is not formed. That is why, due to the rocking of the pin 7 in a direction of the arrowhead F, one edge 25 of the oil reservoir 22 reaches one edge of the slidable range H, thereby, the lubrication oil is supplied to the range between P and P1, due to the rocking of the pin 7 in a direction of the arrowhead G, the other edge 26 of the oil reservoir 22 reaches one edge of the slidable range H, and thereby, the lubrication oil is supplied from this oil reservoir 22 to the range between Q and Q1.

In other words, assuming that the rocking angle is $\alpha$, a center angle (a groove width angle) of the oil reservoir 22 is B, and a center angle of the slidable range H is A, it is preferable that the groove width angle B is $(A-2\times\alpha)$ and over. Specifically, for example, the center angle A of the slidable range H is 70 to 90 degrees, and the rocking angle $\alpha$ is about 30 degrees, so that the groove width angle B becomes (70 to 90 degrees)$-2\times30$=(10 to 30 degrees). Therefore, it is preferable that the groove width angle B as a circumferential direction range H1 of the oil reservoir 22 is defined as not more than the center angle, i.e., 40 degrees centering on the pin axial center O. Further, it is preferable that the groove width angle B is in the range of 10 degrees to 30 degrees. In addition, as shown in FIG. 2, a length in an axial direction (i.e., a length in a longitudinal direction) of the flat face portion 23 composing the oil reservoir 22 is defined as being sufficient to reach the first seal devices 14. That is why the flat face portion 23 corresponds to the both bushes 8.

In this way, it is possible to prevent formation of a no-lubrication portion, to which no lubrication oil is supplied, within the slidable range H, in which an outer peripheral face 7a of the pin 7 and an inner peripheral face 8a of the bush 6 partially and slidably contact with each other. Thereby, as compared to the conventional bearing device in which the no-lubrication portion is formed, a load (tractional force) can be remarkably increased till the burn-in occurs, so that, according to the present invention, the bearing device having the excellent durability is capable of being realized. In addition, since the oil reservoir 22 can be formed by forming the flat face portion 23 at the side of the pin 7, the bearing device can be easily processed. The slidable range is also formed by the pin 7 and the bush 9. Since the length in the axial center direction of the bush 9 is large, there is no possibility of burn-in. In this case, the oil reservoir 22 is also formed at the outer peripheral face 7a of the pin 7, so that it is possible to prevent formation of a no-lubrication portion between the pin 7 and the bush 9.

Figure 5:
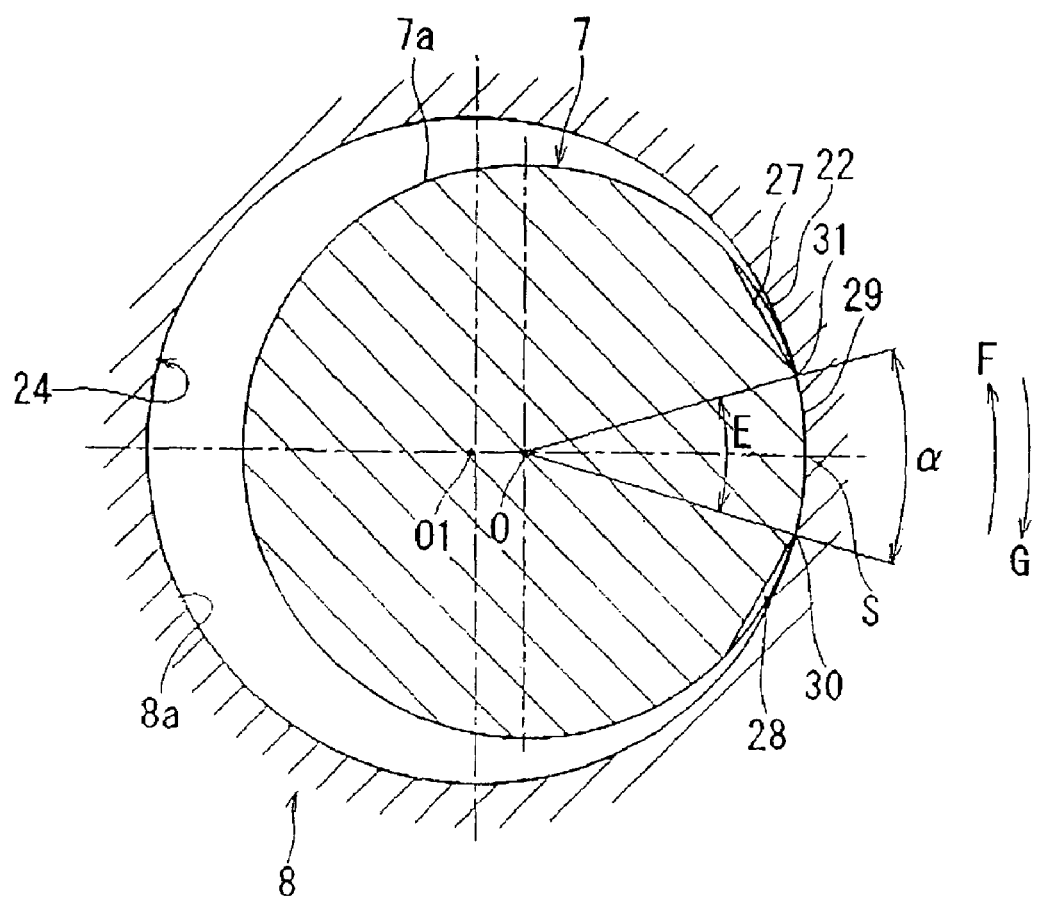
FIG. 5 is a substantial part simplified cross sectional view for showing another embodiment of the bearing device according to the present invention.
Figure 6:
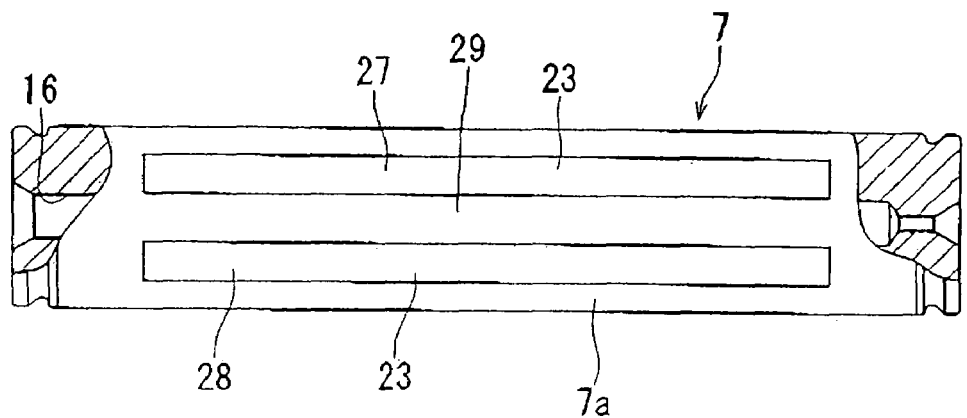
FIG. 6 is a plan view of a pin of the above described bearing device shown in FIG. 5.
Figure 7:
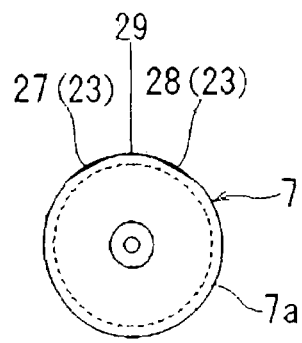
FIG. 7 is a side view of the pin of the above described bearing device shown in FIG. 5.

In the next place, FIG. 5 shows another embodiment according to the present invention. In this case, the oil reservoir 22 is configured by a pair of a first oil reservoir 27 and a second oil reservoir 28. In other words, as shown in FIG. 6 and FIG. 7, the oil reservoir 22 which is formed by the first and second oil reservoirs 27 and 28 extending along the central axis direction of the pin is formed at the outer peripheral face 7a of the pin 7, and further, an interval 29 between these first and second oil reservoirs 27 and 28 is rocked centering on the center S in the circumferential direction of the above described slidable range H (see FIG. 5). In this case, it is also possible to configure each of the first and second oil reservoirs 27 and 28 on the flat faces 23.

In this case, as shown in FIG. 5, a region of the interval 29 (i.e, a center angle E of the interval 29) between the first and the second oil reservoirs 27 and 28 is set to the rocking angle $\alpha$ and below, specifically, 40 degrees and below, and preferably, the region of the interval 29 is set within the range of 10 degrees to 30 degrees. In other words, if the region of the pin interval 29 is set to the rocking angle α, in the case that the pin 7 is rocked by α/2 in a direction represented by the arrowhead F with respect to the bush 8 under the condition shown in FIG. 5, one edge 30 of the second oil reservoir 28 reaches the center S in the circumferential direction, and in the case that the pin 7 is rocked by α/2 in a direction represented by the arrowhead G with respect to the bush 8 under this condition shown in FIG. 5, the other edge 31 of the first oil reservoir 27 reaches the center S in the circumferential direction. Therefore, the lubrication oil is supplied by the rocking of the pin 7 between this interval 29 and an inner peripheral face of the bush 8 corresponding to this interval 29.

Thus, even in the bearing device shown in FIG. 5, it is possible to prevent formation of a no-lubrication portion, to which no lubrication oil is supplied. Thereby, as in the above described bearing device shown in FIG. 1, a load (tractional force) can be remarkably increased till the burn-in occurs, so that, according to the present invention, the bearing device having the excellent durability is capable of being realized. Further, as in the oil reservoir 22 of the above described bearing device shown in FIG. 1, a length in an axial direction (i.e., a length in a longitudinal direction) of the first and second oil reservoirs 27 and 28 of the bearing device shown in FIG. 5 is defined as being sufficient to reach the first seal devices 14 (see FIG. 2). In addition, as shown in FIG. 5, in the case that the oil reservoir 22 is configured by a pair of the first and second oil reservoirs 27 and 28, in order to prevent formation of the no-lubrication portion, it is preferable that a center angle of the interval 29 is set to about 10 to 30 degrees. However, considering the surface pressure, the more preferable it is, the smaller surface pressure is and the range of the above described interval 29 is preferably as wide as possible. Therefore, the center angle E of the interval 29 is preferably set to α.

Figure 8:
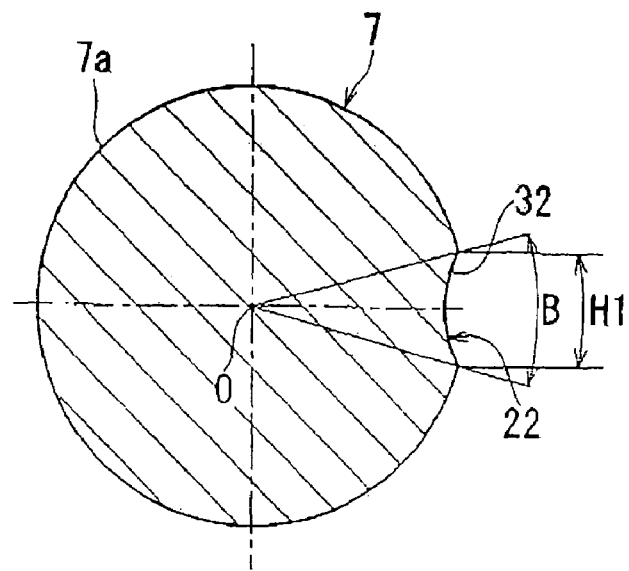
FIG. 8 is a simplified cross sectional view for showing a modified embodiment of the pin of the above described bearing device shown in FIG. 1.
Figure 9:
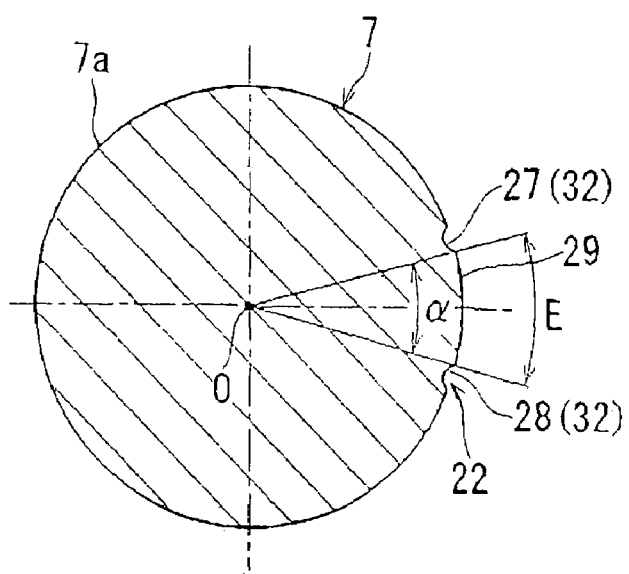
FIG. 9 is a simplified cross sectional view for showing a modified embodiment of the pin of the above described bearing device shown in FIG. 5.

In the meantime, both of the oil reservoir 22 shown in FIG. 1 and the oil reservoir 22 shown in FIG. 5 are configured by the flat face portions 23, which is elongated in a central axis direction of the pin, however, as shown in FIG. 8 and FIG. 9, they may be configured by a concave groove 32, which is elongated in a central axis direction of the pin. In this case, according to the bearing device shown in FIG. 8, as in the bearing device shown in FIG. 1, it is preferable that the circumferential direction range H1 of the oil reservoir 22 (the concave groove 32) is set within the range less than a center angle (a groove width angle B) 40 degrees centering on the pin axial center O, particularly, it is set within the range of 10 degrees to 30 degrees. In addition, according to the bearing device shown in FIG. 9, as in the bearing device shown in FIG. 5, it is preferable that the range of the interval 29 between the first and second oil reservoirs 27 and 28 (i.e., the center angle E of the interval 29) is set to the rocking angle α and below, specifically, 40 degrees and below, preferably, the region of the interval 29 is set within the range of 10 degrees to 30 degrees.

Figure 10:
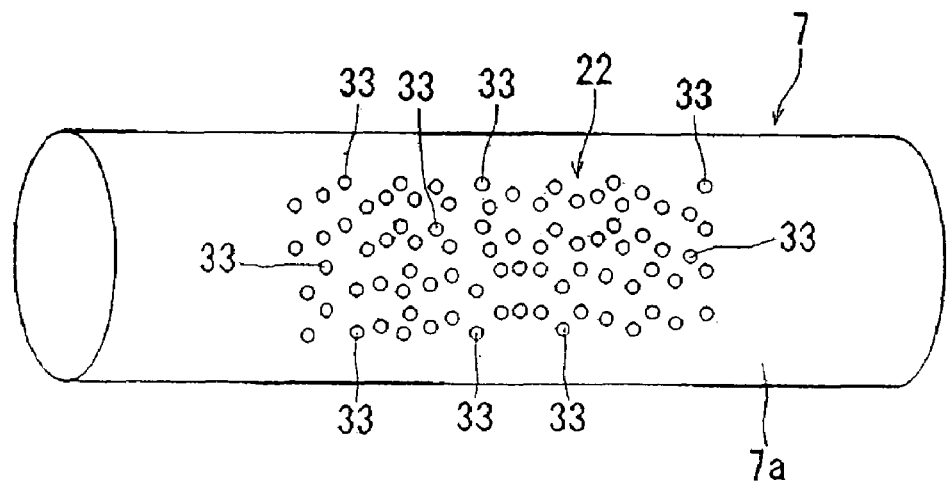
FIG. 10 is a simplified perspective view for showing another embodiment of the pin of the bearing device according to the present invention.
Figure 11:
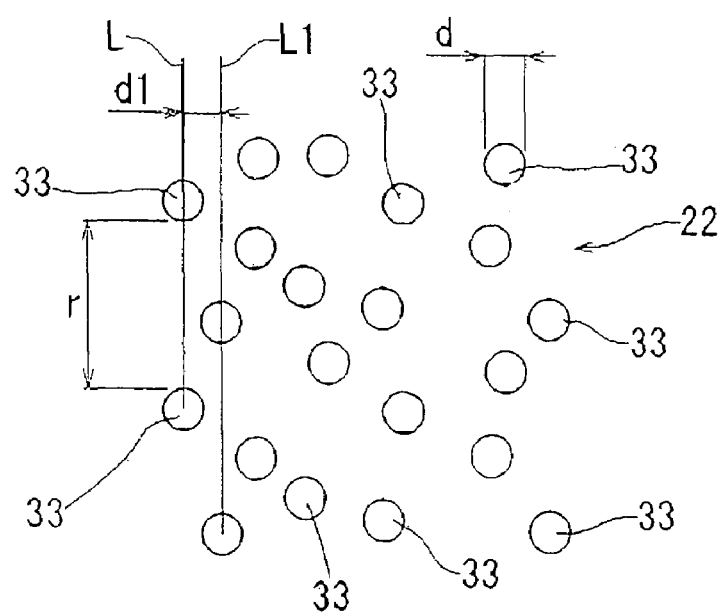
FIG. 11 is a simplified view of an oil reservoir of the above described bearing device shown in FIG. 10.
Figure 12:
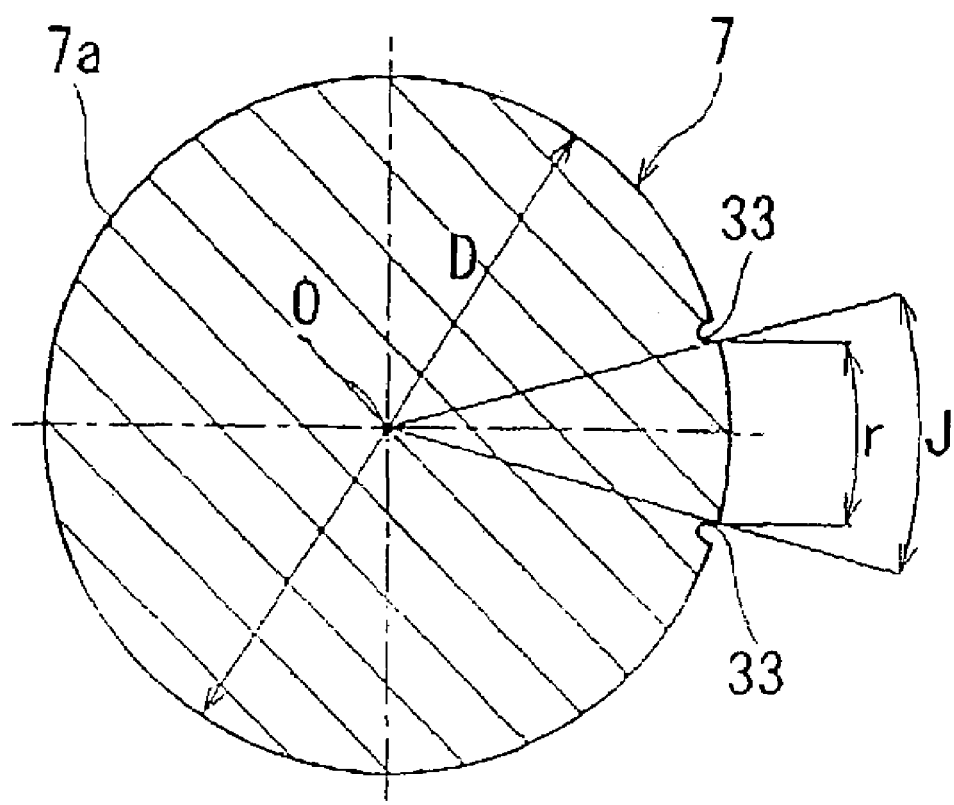
FIG. 12 is a simplified cross sectional view of the pin of the above described bearing device shown in FIG. 10.
Figure 13:
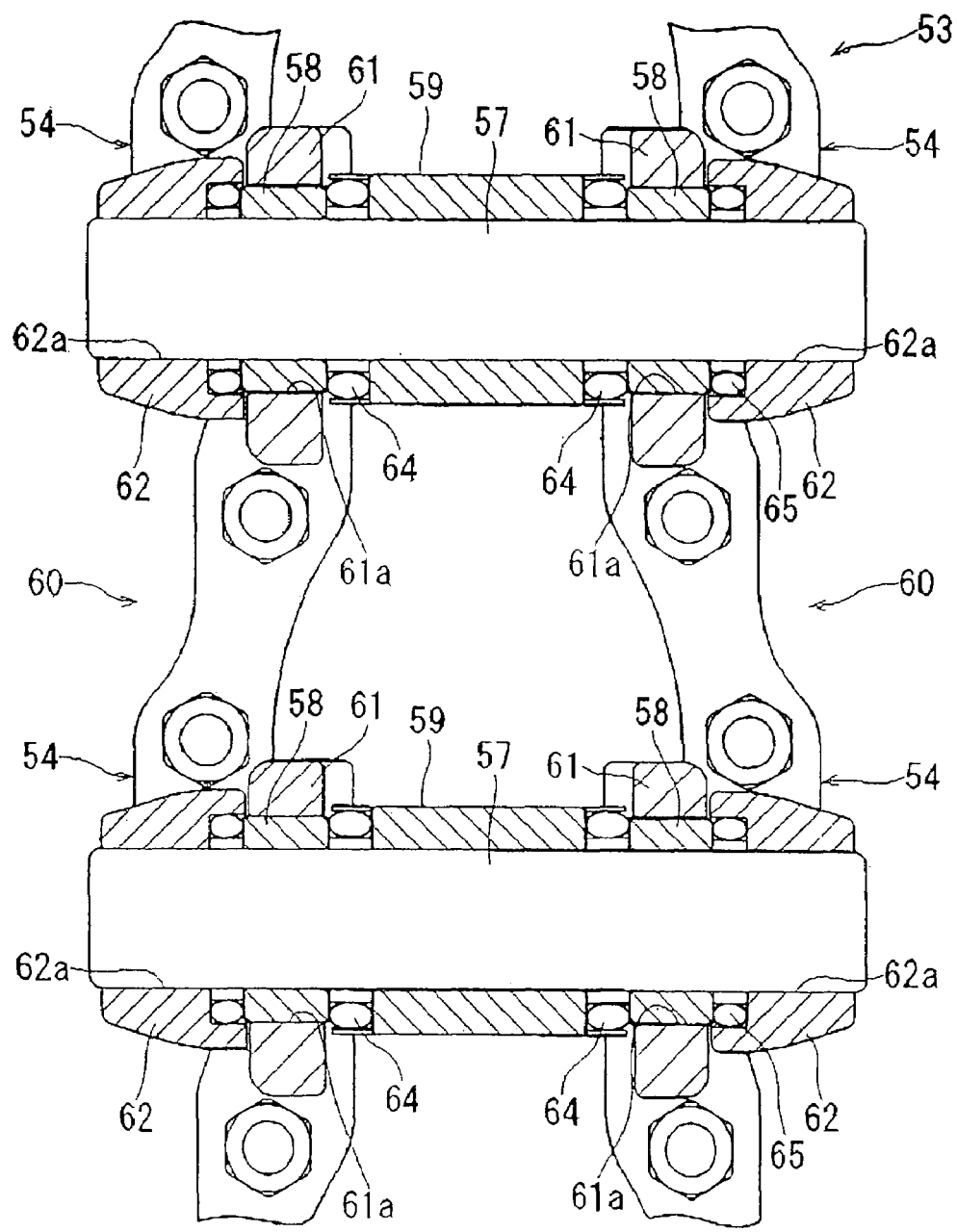
FIG. 13 is a substantial part cross sectional view of a crawler track, in which a conventional bearing device is used.
Figure 14:
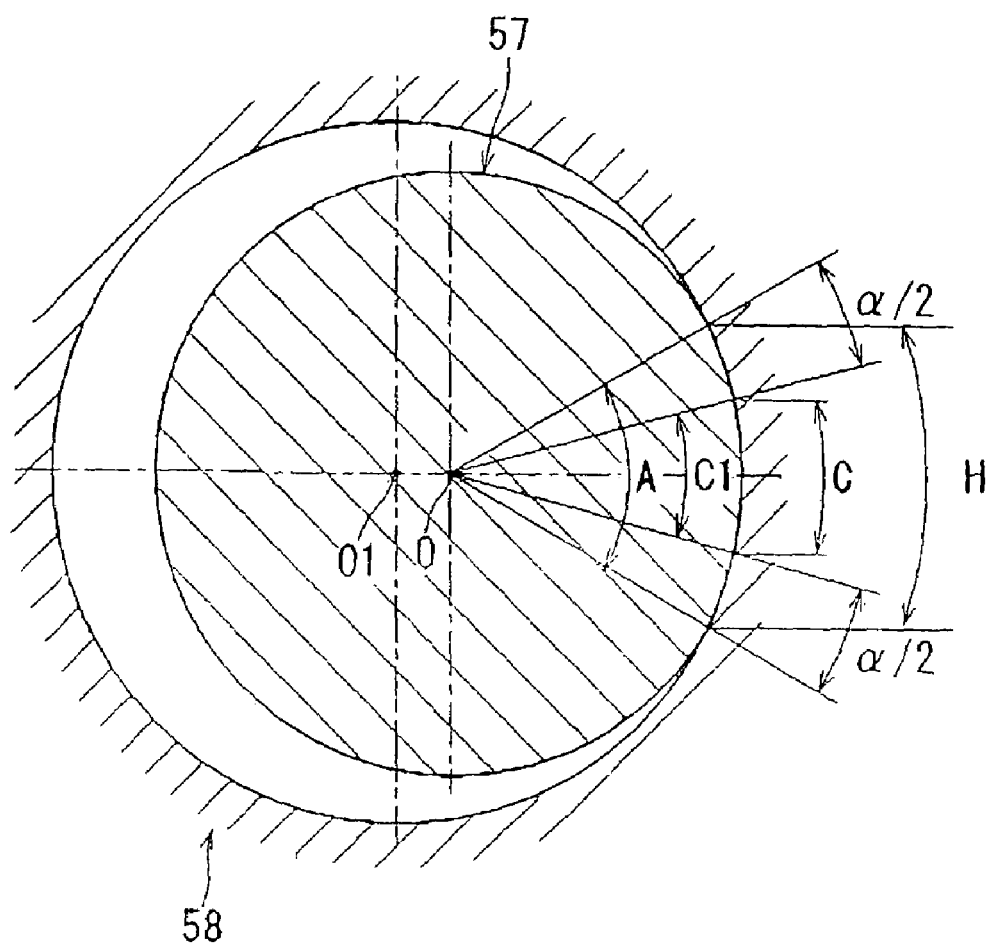
FIG. 14 is a simplified cross sectional view of the conventional bearing device.

In the next place, FIGS. 10 to 12 show the pin 7 according to the another embodiment. In this case, the oil reservoir 22 is configured by a plurality (many) of punctate concave portions 33. In other words, when the pin 7 is rocked with respect to the bush 8, in the case that a distance from passage of one punctate concave portion 33 through a certain position of the inner peripheral face 8a of the bush 8 to passage of a next punctate concave portion 33 through this position is defined as r, a pitch angle of these punctate concave portion 33 is defined as J, and a diameter of the pin 7 is defined as D, they are set as to be J=(360×r)/πD. Therefore, when J becomes the above described rocking angle α and below, it is possible to prevent formation of the no-lubrication portion, to which the lubrication oil is not supplied. Specifically, on the same circumferential direction on the outer peripheral face 7a of the pin 7, at least two of the above described punctate concave portion 33 are arranged in the range not more than said center angle, i.e., 40 degrees, preferably, in the range of 10 to 30 degrees. In addition, the diameter d of each punctate concave portion 33 is defined as not less than an interval d1 between one circumferential direction line L, in which the punctate concave portions 33 are arranged, and the other circumferential direction line L1, which is adjacent to this one circumferential direction line L. Thus, it is possible to prevent formation of the no-lubrication portion between the adjacent circumferential direction lines L and L1. Further, specifically, for example, the diameter d of each punctate concave portion 33 is about 2 to 5 mm.

Therefore, even the oil reservoir 22 configured by a plurality of punctate concave portions 33 as shown in this FIG. 10 or the like makes it possible to prevent formation of the no-lubrication portion, to which the lubrication oil is not supplied.

In the meantime, since only a plurality of punctate concave portions 33 is formed on the outer peripheral face 7a in the oil reservoir 22 shown in FIG. 10 or the like, it is possible to form this oil reservoir 22 by a shot peening for beating a metal shot (a steel grain) on a metal processed face. Consequently, this embodiment has the advantage of being able to easily form the oil reservoir 22 without using a particular apparatus.

The specific embodiments of the bearing device according to the present invention are described above, however, the present invention is not limited to the above described embodiments, but the present invention may be embodied in other specific forms without departing from the spirit or essential characteristics thereof. For example, the second seal device 15 is removed (omitted) and, in place of the bushes 8 and 9, a single bush may be formed by integrating the bushes 8 and 9. In addition, the oil reservoir 22 may be configured in a spiral groove to be formed on the outer peripheral face 7a, and further, in the case of configuring it by the concave groove 32, its cross sectional form is not limited to a semicircle, but it is possible to adopt various forms such as a triangle form, an oblong form, and a semi-polygonal form or the like as the its cross sectional form. In addition, a portion, at which this bearing device is used, is not limited to the crawler track 2, and in an apparatus in which, the external force (i.e., the tractional force) acts on in the same direction, the pin is slid with the bush in the same range and these conditions are hardly released, for example, a construction machine, this bearing device is capable of being used in an axis branch portion of a hydraulic boom and a crane boom or the like, and a crash bearing or the like of a breaker. In addition, this bearing device is capable of being used also in various industrial machines other than the construction machine.

We claim:
1. A bearing device comprising:
a bush;
a pin inserted into said bush, said pin fixed at end portions of said pin, said pin having a center S on an outer peripheral face thereof and a pin axial center therein, said center S located at a direction opposed to a traveling direction X;
wherein said bush and said pin are relatively rockable, and said rocking forms a slidable range in which an outer peripheral face of said pin and an inner peripheral face of said bush partially and slidably contact each other;

a first oil reservoir and a second oil reservoir formed on said outer peripheral face of said pin and elongated along a pin axial center direction, having an interval between them such that a range of said interval is set not more than a center angle of 40 degrees centering on said pin axial center, wherein no other oil reservoirs are formed on the face of said pin;

wherein said first and second oil reservoirs are rocked centering on the center S of said pin.

2. A bearing device according to claim 1, wherein each of said oil reservoirs is configured by a concave portion, which is formed on said outer peripheral face of said pin along the pin axial center direction.

3. A bearing device according to claim 1, wherein each of said oil reservoirs is configured by a flat face portion, which is formed on said outer peripheral face of said pin along the pin axial center direction.

* * * * *